(12) United States Patent
Shackelford et al.

(10) Patent No.: US 11,568,357 B2
(45) Date of Patent: Jan. 31, 2023

(54) SYSTEMS AND METHODS OF VALIDATING DATA ENTRY AND GENERATING ERROR FLAGS USING ARTIFICIAL INTELLIGENCE

(71) Applicant: Greenline, LLC, Franklin, TN (US)

(72) Inventors: Phillip G. Shackelford, Memphis, TN (US); Nick Meurrier, Memphis, TN (US)

(73) Assignee: GREENLINE, LLC, Memphis, TN (US)

( * ) Notice: Subject to any disclaimer, the term of this patent is extended or adjusted under 35 U.S.C. 154(b) by 115 days.

(21) Appl. No.: 16/883,860

(22) Filed: May 26, 2020

(65) Prior Publication Data

US 2021/0374657 A1    Dec. 2, 2021

(51) Int. Cl.
*G06Q 10/08* (2012.01)
*G06F 16/23* (2019.01)
*G06Q 30/02* (2012.01)

(52) U.S. Cl.
CPC ....... *G06Q 10/087* (2013.01); *G06F 16/2365* (2019.01); *G06Q 30/0283* (2013.01)

(58) Field of Classification Search
None
See application file for complete search history.

(56) References Cited

U.S. PATENT DOCUMENTS

| 5,612,868 A | 3/1997 | Off et al. |
| 9,262,451 B1 * | 2/2016 | Singh ................. G06F 16/215 |
| 2003/0004831 A1 | 1/2003 | Owens |
| 2003/0041291 A1 | 2/2003 | Hashem et al. |
| 2003/0069778 A1 | 4/2003 | Menninger et al. |
| 2003/0136834 A1 | 7/2003 | Scheurer |
| 2003/0236718 A1 | 12/2003 | Yang et al. |
| 2004/0153821 A1 | 8/2004 | Kuhmann et al. |
| 2005/0278587 A1 | 12/2005 | Breitling et al. |

(Continued)

FOREIGN PATENT DOCUMENTS

CN    20160298950    7/2016

OTHER PUBLICATIONS

U.S., PCT/US2021/033440, ISR and Written Opinion, dated Aug. 25, 2021.

(Continued)

*Primary Examiner* — Paul Danneman
(74) *Attorney, Agent, or Firm* — One LLP

(57) ABSTRACT

The systems and methods of automated auditing data entry for a distribution network of products: customizing product information based on an equivalent independent of brand; receiving data entry records from plurality of consumption locations operating independently with a product using a variable brand; applying a set of rules on the data entry records to identify errors that uniformly conform the following perspectives: consumer, seller and manufacturer; determining whether errors exist; identifying whether errors that exist are of error types that can be fixed; fixing errors if errors exist of error types that can be fixed; identifying whether errors that exist are of error types that cannot be fixed; queuing errors for human review if errors exist of error types that cannot be fixed; analyzing subsequent actions triggered by human review to modify the rules; and approving the data entry record for further processing or completion only if no errors exist.

20 Claims, 15 Drawing Sheets

(56) References Cited

U.S. PATENT DOCUMENTS

| | | |
|---|---|---|
| 2010/0301113 A1 | 12/2010 | Bohn et al. |
| 2011/0010229 A1 | 1/2011 | Ow |
| 2012/0005079 A1 | 1/2012 | Pitroda et al. |
| 2012/0072321 A1 | 3/2012 | Christian et al. |
| 2012/0231438 A1 | 9/2012 | Fakhrai |
| 2012/0239560 A1 | 9/2012 | Pourfallah et al. |
| 2013/0024267 A1 | 1/2013 | Libenson et al. |
| 2014/0052623 A1 | 2/2014 | Pitroda et al. |
| 2015/0032611 A1 | 1/2015 | Crowley et al. |
| 2016/0042389 A1 | 2/2016 | Simmons |
| 2016/0071197 A1 | 3/2016 | Elsworth |
| 2016/0210578 A1 | 7/2016 | Raleigh et al. |
| 2016/0321411 A1 | 11/2016 | Wiley |
| 2017/0092900 A1 | 3/2017 | Yang |
| 2017/0293888 A1 | 10/2017 | Shackelford |
| 2017/0354180 A1 | 12/2017 | Fornarelli |
| 2021/0295369 A1 | 9/2021 | Docken et al. |
| 2021/0368742 A1 | 12/2021 | Shackelford et al. |
| 2021/0374789 A1 | 12/2021 | Shackelford et al. |

OTHER PUBLICATIONS

WO, PCT/US2021/033445, ISR and Written Opinion, dated Aug. 24, 2021.

WO, PCT/US2021/033448, ISR and Written Opinion, dated Jun. 30, 2021.

\* cited by examiner

FIG. 3

Clinics → 370

Search: [ ]  Show [10] entries  Status: [NVA - GoGreen Live ▼]  [RESET] ☐ Remember Settings?  [EXPORT]

Showing 1 to 10 of 64 entries (filtered from 8,679 total entries)  First|Previous [1][2][3][4][5]...[7] Next|Last

| ID ◇ | Clinic | ◇ Install ◇ | Last Invoice ◇ | Product Sync ◇ | Dirty Redemptions ◇ | Pending Approval ◇ | PAR ◇ | Mapped Products ◇ | Unprocessed Recommendations ◇ | Critical Product Changes (NonCritical) ◇ | Go Green | Action/Status |
|---|---|---|---|---|---|---|---|---|---|---|---|---|
| 6602 | All Pet Care Hospital-6602 Clearwater, FL | 06/29/18 12/21/18 | 12/31/19 >6 hrs ago | 12/15/19 12:41:56 AM CST | 1 | 17 12/05/19 | 50 | 209 | 238 | 31 (347) | ⊕□ | ⊠⊘□♦⊕Y |
| 8067 | Lums Pond Animal Hospital - 8067 Bear, DE | 01/17/19 12/28/18 | 12/31/19 >6 hrs ago | 12/09/19 2:17:06 AM CST | 0 | 29 12/08/19 | 45 | 119 | 158 | 1 (100) | ⊕ | ⊠⊘□♦⊕Y |
| 5238 | Animal Clinic of Mill... -5238 Millville, NJ | 03/18/19 01/23/19 | 12/29/19 >6 hrs ago | 12/29/19 9:51:35 PM CST | 0 | 0 not yet | 43 | 245 | 243 | 22 (330) | ⊕□ | ⊠⊘□♦⊕Y |
| 8562 | PVCC Scottsdale Ranch - 8562 Scottsdale, AZ | 03/07/19 04/15/19 | 12/15/19 >6 hrs ago | 12/15/19 1:51:33 AM CST | 2 | 15 11/25/19 | 38 | 72 | 93 | 3 (112) | ⊕Y | ⊠⊘□♦⊕Y |
| 5886 | Gabriel Park Veterina... - 5886 Portland, OR | 05/24/18 05/17/19 | 12/31/19 >6 hrs ago | 12/29/19 12:50:44 AM CST | 0 | 26 12/18/19 | 37 | 96 | 91 | 4 (227) | ⊕ | ⊠⊘□♦⊕Y |
| 9858 | Berkshire Veterinary... - 9858 Sandy Hook, CT | 09/16/19 09/16/18 | 12/31/19 >6 hrs ago | 12/29/19 11:33:27 PM CST | 0 | 3 12/31/19 | 36 | 21 | 18 | 0 (4) | ⊕ | ⊠⊘□♦⊕Y |
| 8265 | Tidewater Veterinary... - 8265 Charlotte Hall, MD | 02/05/19 02/06/19 | 12/31/19 >6 hrs ago | 12/02/19 12:28:19 AM CST | 1 | 35 12/24/19 | 35 | 74 | 97 | 23 (22) | ⊕□ | ⊠⊘□♦⊕Y |
| 305 | Lees Veterinary Hospital - 305 Cuffman, AL | 04/19/18 01/05/18 | 12/31/19 >6 hrs ago | 12/02/19 12:28:10 AM CST | 1 | 11 12/17/19 | 34 | 187 | 167 | 10 (119) | ⊕□ | ⊠⊘□♦⊕Y |
| 3035 | The Plains Veterinary... - 3035 The Plains, OH | 05/24/17 05/09/18 | 12/31/19 >6 hrs ago | 12/09/19 12:36:15 AM CST | 1 | 1 12/28/10 | 34 | 164 | 172 | 63 (1100) | ⊕ | ⊠⊘□♦⊕Y |
| 8635 | PVCC Colonial Park An -8635 Harrisburg, PA | 03/28/19 01/16/19 | 12/09/19 >6 hrs ago | 12/09/19 12:11:57 AM CST | 2 | 183 11/20/19 | 34 | 104 | 120 | 2 (113) | ⊕Y | ⊠⊘□♦⊕Y |
| 4427 | Tri-County -7279 Pilesgrove, NY | 03/19/19 03/19/18 | 12/31/19 >6 hrs ago | 12/09/19 10:56:42 PM CST | 0 | 17 12/07/19 | 33 | 74 | 74 | 2 (28) | ⊕ | ⊠⊘□♦⊕Y |
| 4450 | Mid North Animal Hospital -4450 | | 10/03/19 | 12/15/19 | 0 | 0 | 33 | 225 | 184 | 5 | ⊕ | ⊠⊘□♦⊕Y |

Adjust Min/Max Pricing fro PAR (Experienced Users Only!)

Clinic: Tidewater Veterinary Hospital, LLC (8265)
Clinic Product: INT51100IN - INTERCEPTOR PLUS 51-100# 6M (ID: 17013855)
Mapped Product: Interceptor Plus (50.1-100 lbs) Blue 1 pk

| Max Doses | | Matching Terms | | Match Count | |
|---|---|---|---|---|---|
| Master | Clinic | Master | Clinic | Master | Clinic |
| 16.00 | | Interceptor plus | | 2 | |

Ignore:
☐ Min Price ☐ Max Price ☐ Max Dose ☐ N-Pack (not used)

| | Min Price Per Dose | | | Max Price Per Dose | | |
|---|---|---|---|---|---|---|
| Qty | Master | Clinic* | | Master | Clinic* | |
| 1 | $5.50 | | | $18.00 | | |
| 6 | $5.00 | | | $15.00 | | |
| 12 | $5.00 | | | $15.00 | | |

[ADD NEW]

Last Override applied on Newer (System)

*Matching Terms are additive

[CLOSE] [APPLY CHANGES]

| | Max Price Per Dose | |
|---|---|---|
| | Master | Clinic* |
| | $18.00 | 19 |
| | $15.00 | 16 |
| | $15.00 | 16 |

| ID | Clinic | Install | Last Invoice | Product Sync | Dirty Redemptions | Pending Approval | PAR | Mapped Products | Unprocessed Recommendations | Critical Product Changes (NonCritical) | Go Green | Action/Status |
|---|---|---|---|---|---|---|---|---|---|---|---|---|
| 7677 | NVA Parkway Veterinar... -7677 Cape May Court House, NJ | 11/01/18 05/29/19 | 12/25/19 >6 hrs ago | 12/16/19 1:00:58 AM CST | 0 | 1 12/25/19 | 3 | 355 | 327 | 12 (512) | | |
| 7592 | NVA Memorial Cat Hospital - 7592 Houston, TX | 10/18/18 09/16/19 | 10/23/19 >6 hrs ago | 10/05/19 3:34:35 AM CST | 0 | 5 10/19/19 | 3 | 42 | 64 | 7 (302) | | |
| 7454 | NVA North Hardin Vete... -7454 Radcliff, KY | 10/31/18 10/11/18 | 12/23/19 >6 hrs ago | 11/24/19 2:40:20 AM CST | 7 | 91 12/25/19 | 5 | 77 | 230 | 6 (247) | | |
| 7403 | NVA Animal Hospital o... - 7403 Woodstock, CA | 10/09/18 10/24/18 | 12/09/19 >6 hrs ago | 12/09/19 3:05:46 AM CST | 4 | 17 11/10/19 | 3 | 118 | 117 | 23 (255) | | |
| 7330 | NVA North River Anima... - 7330 Parish, FL | 09/19/18 09/13/19 | 12/24/19 >6 hrs ago | 12/15/19 1:42:55 AM CST | 0 | 3 12/25/19 | 0 | 371 | 350 | 21 (505) | | |
| 7326 | NVA Kirkman Road Vete... - 7326 Orlando, Fl | 09/19/18 09/29/19 | 12/07/19 >6 hrs ago | 11/24/19 1:22:34 AM CST | 2 | 20 12/21/19 | 3 | 277 | 276 | 5 (451) | | |
| 7310 | NVA Lenoir Veterinary,... - 7310 Lenoir, NC | 09/18/18 10/05/18 | 12/23/19 >6 hrs ago | 12/03/19 11:04:02 AM CST | 1 | 13 10/05/19 | 0 | 144 | 135 | 22 (285) | | |
| 7306 | NVA Appalachian - New... - 7306 Boone, NC | 09/18/18 10/05/18 | 11/02/19 >6 hrs ago | 11/10/19 1:03:11 AM CST | 0 | 0 not yet | 1 | 36 | 162 | 5 (519) | | |
| 7282 | NVA Buffalo Small Ani... -7282 Buffalo, NY | 09/19/18 06/10/19 | 11/02/19 >6 hrs ago | 10/12/19 12:18:05 AM CST | 5 | 54 06/02/19 | 0 | 83 | 187 | 15 (215) | | |
| 7279 | NVA Brighton-Eggert A... -7279 Tonawanda, NY | 08/06/19 05/17/19 | 11/03/19 >6 hrs ago | 10/27/19 2:35:21 AM CST | 0 | 0 not yet | 0 | 48 | 253 | 18 (562) | | |

| | | | Clinics | | | | | | |
|---|---|---|---|---|---|---|---|---|---|

Search: [north hardin] Show [10] entries  Status: [NVA - GoGreen Live] [RESET] ☑ Remember Settings?

Showing 1 to 10 of 64 entries (filtered from 8,679 total entries)  [First][Previous] [1][2][3][4][5][6][7] [Next][Last] [EXPORT]

| ID | Clinic | Install | Last Invoice | Product Sync | Dirty Redemptions | Pending Approval | PAR | Mapped Products | Unprocessed Recommendations | Critical Product Changes (NonCritical) | Go Green | Action/Status |
|---|---|---|---|---|---|---|---|---|---|---|---|---|
| 7454 | NVA North Hardin Vete...-7454 Radcliff, KY | 10/31/18 | 12/23/19 | 11/24/19 | 7 | 91 | 5 | 77 | 230 | 6 (247) | | |
| | | 10/11/18 | >6 hrs ago | 2:46:20 AM CST | | 03/11/19 | | | | | | |

Showing 1 to 1 of 1 entries (filtered from 8,679 total entries)  [First][Previous] [1][2][3][4][5][6][7] [Next][Last]

PRIVATE POLICY   TERMS AND CONDITIONS           ALL RIGHTS RESERVED   Live Chat

| | | | Ignore Qty | | Comp. Dur. | Free Dose? | Excl. Disc? | Cp? | My Product | |
|---|---|---|---|---|---|---|---|---|---|---|
| 1 | ⊕⊛☒ | Advantage II Canine (Free dose) | ☐ | pk | ☐ | ☐ | ☐ | ☐ | | Clear ⊞ |
| 2 | ⊕⊛☒ | Advantage II Canine (Discount) | ☐ | pk | ☐ | ☐ | ☐ | ☐ | | Clear ⊞ |
| 3 | ⊕⊛☒ | Advantage II (1-10 lbs) | ☐ | pk | ☐ | ☐ | ☐ | ☐ | | Clear ⊞ |
| 4 | ⊕⊛☒ | Advantage II (11-20 lbs) | ☐ | pk | ☐ | ☐ | ☐ | ☐ | | Clear ⊞ |
| 5 | ⊕⊛☒ | Advantage II (21-55 lbs) | ☐ | pk | ☐ | ☐ | ☐ | ☐ | (6010S) Advantage Single Dose Red-Dogs [2242] | Clear Saved ⊞ |
| 6 | ⊕⊛☒ | Advantage II (55lbs & up) | ☐ | pk | 4 | ☐ | ☐ | ☐ | (1010AS) Advantage Single Dose Blue-Dogs [2242] | Clear Saved ⊞ |
| * | | | | | | | | | (1010A) Advantage Dogs >55# Blue-4 pk [2242] | Clear Saved ⊞ |
| 7 | ⊕⊛☒ | Advantage II Feline (Free dose) | ☐ | pk | ☐ | ☐ | ☐ | ☐ | | Clear ⊞ |
| 8 | ⊕⊛☒ | Advantage II Feline (Discount) | ☐ | pk | ☐ | ☐ | ☐ | ☐ | | Clear ⊞ |
| 9 | ⊕⊛☒ | Advantage II (1-5 lbs) | ☐ | pk | ☐ | ☐ | ☐ | ☐ | (6000S) Advantage Single Dose Red-Dogs [2242] | Clear ⊞ |
| 10 | ⊕⊛☒ | Advantage II (5-9 lbs) | ☐ | pk | ☐ | ☐ | ☐ | ☐ | (03189?) Epiotic Advanced Ear Solution Virbac 8oz [2242] * | |
| 11 | ⊕⊛☒ | Advantage II (9 lbs & up) | ☐ | pk | ☐ | ☐ | ☐ | ☐ | (60001) Advantix II Dogs <10# Green - 4pk [2242] | |
| | | | | | | | | | (60001S) Advantix Single Dose Green-Dogs [2242]* | |
| 12 | ⊕⊛☒ | Advantage Multi Canine (Free dose) | ☐ | pk | ☐ | ☐ | ☐ | ☐ | (60002) Advantix II Dogs 11-20# Teal - 4pk [2242] | |
| | | | | | | | | | (60002S) Advantix Single Dose Teal-Dogs [2242] | |
| 13 | ⊕⊛☒ | Advantage Multi Canine (Discount) | ☐ | pk | ☐ | ☐ | ☐ | ☐ | (60003) Advantix Single Dose Red-Dogs [2242] | |
| 14 | ⊕⊛☒ | Advantage Multi (3-9 lbs) | ☐ | pk | ☐ | ☐ | ☐ | ☐ | (6000?S) Advantix Single Dose Red-Dogs [2242] * | |
| 15 | | | | | | | | | (1454) Multi Green Dog 3-9 lbs/6 pk [2242] | Clear ⊞ |
| 16 | ⊕⊛☒ | Advantage Multi (9-20 lbs) | 6 | pk | 6 | ☐ | ☐ | ☐ | (1462S) Multi Teal Dog 9.1-20 lbs Single dose [224 | Clear ⊞ |
| 17 | | | | | | | | | (1462) Multi Teal Dog 9.1-20 lbs/6 pk [2242] | |
| 18 | ⊕⊛☒ | Advantage Multi (20-55 lbs) | ☐ | pk | ☐ | ☐ | ☐ | ☐ | (1470S) Multi Red Dog 20.1-55 lbs Single dose [22 | Clear ⊞ |
| 19 | | | | | | | | | (1470) Multi Red Dog 20.1-55 lbs/6 pk [2242] | |
| 20 | ⊕⊛☒ | Advantage Multi (55-88 lbs) | 6 | pk | 6 | ☐ | ☐ | ☐ | (1489S) Multi Blue Dog 55.1-88 lbs Single dose [22 | Clear ⊞ |

FIG. 15

SYSTEMS AND METHODS OF VALIDATING DATA ENTRY AND GENERATING ERROR FLAGS USING ARTIFICIAL INTELLIGENCE

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Greenline, LLC's concurrently filed patent applications are incorporated herein by reference: (1), titled "SYSTEMS AND METHODS OF IMPLEMENTING AT RESELLER FLEXIBLE AND CUSTOMIZABLE ARCHITECTURE OF TRANSACTION LEVEL SECURITY, AUTHENTICATION AND DIGITAL VERIFICATION OF COUPONS THAT IS CUSTOMER-CENTRIC"; (2), titled "SYSTEMS AND METHODS OF DIGITAL TRACKING OF WELLNESS PROGRAMS WITH DYNAMIC FEEDBACK FROM PETS AT DIFFERENT CLINICS USING DIFFERENT MANUFACTURER PRODUCTS."

FIELD OF THE INVENTION

The present invention is in the technical field of automated auditing of data entry for a distribution network of products. More particularly, the present invention is in the technical field of data entry from sources that are outside the control of the data processing entity that uses varying codes for varying brands. More particularly, the present invention is in the technical field of conforming data entry for different perspectives, i.e., consumer or end-user, seller or retailer and manufacturer.

BACKGROUND

Processing data entry to remove manual errors in entering and, sometimes, even just promoting uniform codes across varying geographic locations that are not in your direct control has always been problematic. While some machine learning models and artificial intelligence systems incorporate feedback and improve over time, there is no system in the market that removes the need for human review of data entry to automatically fix problems.

SUMMARY OF THE INVENTION

The present invention is systems and methods of automated auditing of data entry for a distribution network of products, comprising: customizing product information based on a generic equivalent independent of brand; receiving one or more data entry records from plurality of consumption locations operating independently with a product using a variable brand; applying a set of rules on the data entry records to identify one or more errors that uniformly conform one or more of the following perspectives: consumer, seller and manufacturer; determining whether one or more errors exist; identifying whether one or more errors that exist are of error types that can be fixed automatically; automatically fixing one or more errors if one or more errors exist of error types that can be fixed automatically; identifying whether one or more errors that exist are of error types that cannot be fixed automatically; queuing one or more errors for human review if one or more errors exist of error types that cannot be fixed automatically; analyzing subsequent actions triggered by human review to modify the rules; approving the data entry record for further processing or completion only if no errors exist.

The systems and methods of automated auditing of data entry for a distribution network of products, wherein the error is error of stock keeping unit (SKU) size and price that can be fixed automatically.

The systems and methods of automated auditing of data entry for a distribution network of products, further comprising: updating the inventory numbers at the consumption location to conform correctly.

The systems and methods of automated auditing of data entry for a distribution network of products, wherein the error is a typographical error in a description, naming convention and word combinations that can be fixed automatically.

The systems and methods of automated auditing of data entry for a distribution network of products, wherein the error is based on use of code for a variable brand used previously that can be fixed automatically.

The systems and methods of automated auditing of data entry for a distribution network of products, wherein the error is a mapping error based on previous data entry patterns at the consumption location.

The systems and methods of automated auditing of data entry for a distribution network of products, wherein the rules are customized for a consumption location.

The systems and methods of automated auditing of data entry for a distribution network of products, further comprising: receiving and customizing service information associated with the product; validating based on rules for service the service information.

The systems and methods of automated auditing of data entry for a distribution network of products, further comprising: transmitting conformed data to associated manufacturers for further processing.

The systems and methods of automated auditing of data entry for a distribution network of products, further comprising: transmitting conformed data to consumption location to automatically update inventory.

BRIEF DESCRIPTION OF THE DRAWINGS

The embodiments of this invention are illustrated by way of example and not limitation in the figures of the accompanying drawings, in which like references indicate similar elements and in which:

FIG. 3 is a view of clinics that a data processing entity may handle at any given time, according to one embodiment.

FIG. 5 is an exploded view of rules for pricing and dosage, according to one embodiment.

FIG. 13 is a view of clinics that a data processing entity may handle at any given time with flagged markers, according to one embodiment.

FIG. 14 is a second view of clinics that a data processing entity may handle at any given time with flagged markers, according to one embodiment.

FIG. 15 is an exploded view of options to correct a mapping to uniform transaction codes with dosage information, according to one embodiment.

DETAILED DESCRIPTION OF THE INVENTION

Figure 1:
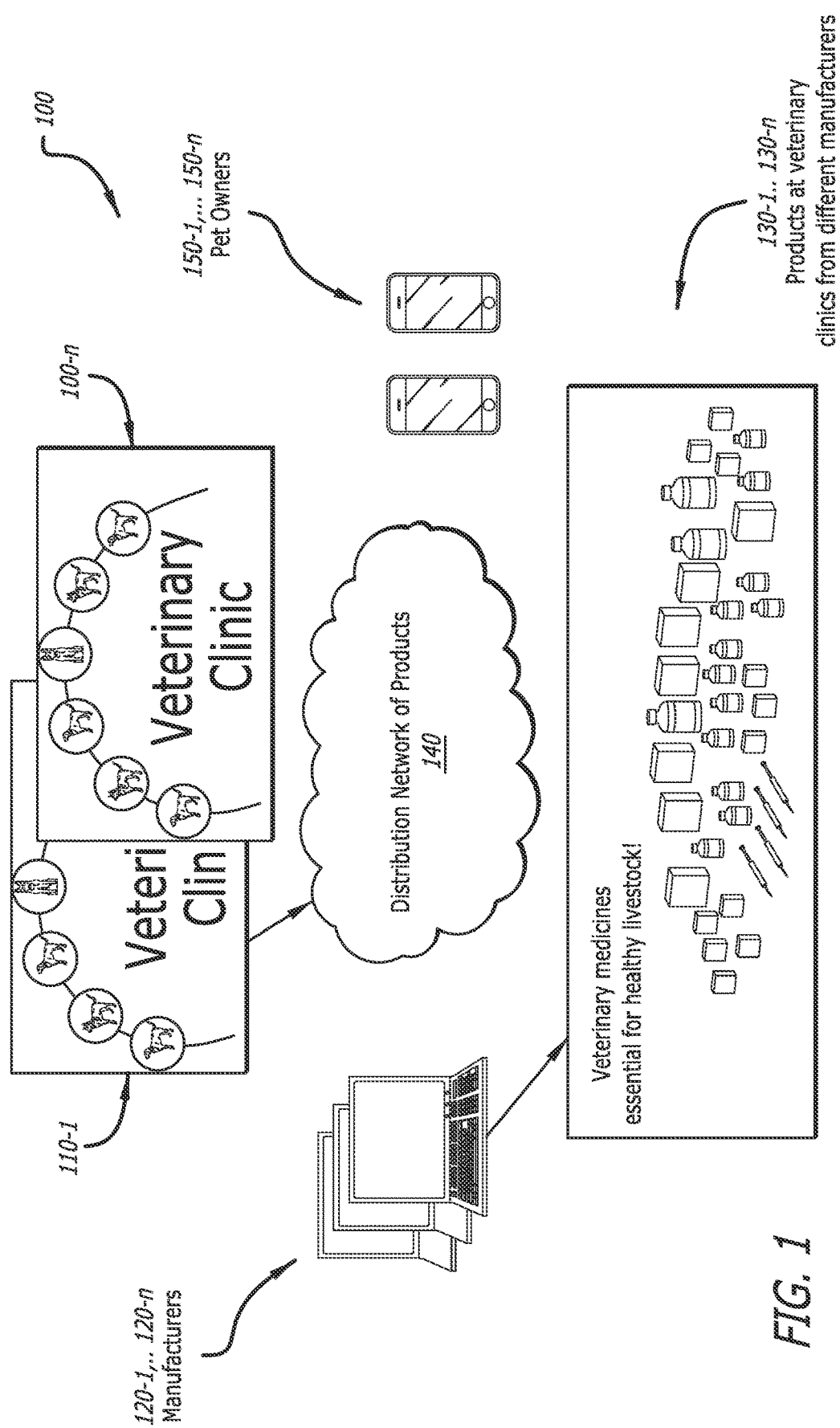
FIG. 1 shows a diagram illustrating an example of systems and methods of automated auditing of data entry for a distribution network of products, for example, in the context of distribution of pet products, with different types and categories of computing devices and varied products at veterinary clinics from different manufacturers.

The systems and methods of automated auditing of data entry for a distribution network of products includes techniques to conform data entry from uncontrolled and varied sources that span across different manufacturers. This allows for automated and efficient handling of transactions from different clinic sources that would otherwise be rejected. A manufacturer can get an up to date view of inventor at a clinic. A clinic has a more efficient way of processing transactions that are immune to many of the mistakes made by operators used in data entry. The data entry processing is not a central service in the traditional sense because it is not tied to either the clinic or the manufacturer. The data processing entity has the ability to process data industry wide and also generate statistical reports including competitive marketing information.

The systems and methods of automated auditing of data entry for a distribution network of products provides for a conforming and uniform data entry solution without requiring a single clinic or manufacturer to invest in it. It is a completely distributed platform that operates from an end-user efficiency perspective. The end-user may change a clinic and continue to get the same quality of products and/or service. The end-user may change the manufacturer or product brand and continue to get the same quality of products and/or service. This allows for freer association between end-users and clinics.

The automated auditing of data entry allows to fix algorithms that fix user input errors. For example, some of the errors may include, leading zero not entered, zip code not matched in the state selected, your name field has both first and last name and the last name field is left blank, pet's date of birth is not entered, invalid codes are entered that don't match with the systems at the manufacturer.

The logic of the data processing software allows taking clinic code, pricing, quantity and gives a recommendation for the corresponding manufacturer code. Human input is processed to give smarter artificial intelligence-based recommendations. Sometimes if a clinic renames a code to match to another medicine, the database becomes non-conforming. Many times, new products are added into the clinic subsystem. Typographical errors that displaces one or two characters are also corrected automatically. Invoices are checked to ensure they are in a band of range between maximum and minimum price set. If not, the invoice is flagged for manual review. Price and dosage errors can also occur. For example, 6 packs are one dose at the manufacturer side. When clinic sells one pack, clinic enters 1 instead of 0.17 quantity and manually adjusts price to $20 for 1 instead of calculating 0.17 of $120. Reprocessing those invoices fixes such anomalies automatically.

The system allows for digital invoices and processing. Data entry is authenticated and persons submitting invoices are required to digitally sign. This ensures accountability for the data entry at the clinic end.

This invention discloses a novel mechanism that is used to aid in scaling even small business who do not have the bandwidth to invest in computer IT and customized solutions. Irrespective of the level of sophistication of the users or computer systems, the invention provides a mechanism to promote efficiencies in transaction handlings. Such a solution is not dependent on the brand names, product types or manufacturers. Regardless of who operates the data entry system, its operations are conformed and unified at the data processing end.

In one embodiment, FIG. 1 depicts a diagram 100 illustrating an example of systems and methods of automated auditing of data entry for a distribution network 140 of products, for example, in the context of distribution of pet products, with different types and categories of computing devices and varied products at veterinary clinics from different manufacturers. In the example of FIG. 1, the environment includes a set of clinics that have varied computer systems and IT departments at 110-1 through an nth clinic system 110-*n*, a distribution network 140, a set of manufacturers supplying the products, device manufacturers 120-1 to 120-*n*, different products originating from different manufacturers having variable parameters for each clinic at 130-1 to 130-*n*, and end-users or pet owners at 150-1 to 150-*n* who may or may not have a computing device, i.e. a web-browser application or a mobile application that connects to the distribution network 140.

In an implementation, the clinic computing system 110 includes components related to network connectivity. In one implementation, the clinic computing system 110 includes hardware and software components to enable data-entry from different computing stations local to the clinic or remote. In one embodiment, the transaction entry is through execution of speech commands. In another implementation, the clinic computing system 110 includes capability to directly communicate with the distribution network 140 that includes authentication and secure communication. The clinic 110 also includes capability to handle variety of pets in one implementation. In one implementation, the clinic 110 specializes in a specific species, for example, cats or dogs. Each clinic is independent of the other and not in any way associated in terms of ownership, control or computer systems installed. In one embodiment, a group of clinics are associated with each other.

The role of the computing device manufacturers 120-1 to 120-*n* is separated from the use of the clinic computing systems 110-1 to 110-*n*. The manufacturers use an audit computing device 120-1 to 120-*n* to conduct audits. The automated audit processing of any data entry at the remote clinic locations can be analyzed, automatically fixed, and queued for human review for errors that cannot be fixed. The automated audit processing analyzes the data entry and determines errors including placing them in categories that can be fixed automatically and categories that require human input. While the manufacturers may have a business partnership with clinics 110-1 to 110-*n*, typically manufacturers do not control the information technology or computer systems that exist at clinics. A manufacturer freely associates with one or more clinics. The data processing invention allows for manufacturers to audit inventory at clinics without adding cumbersome techniques of manual review. Broadly speaking, a manufacturer may have more sophisticated computer systems and applications than those available at clinics.

For a transaction, a user or pet-owner with computing device 150-1 to 150-*n* may visit a clinic to make one or more purchases related to products 130-1 to 130-*n*. In one embodiment, the data entry is executed by an operator at clinic 110. In one embodiment, the data entry for a transaction is entered by an end-user using his or her own computing device 150-1.

A person of ordinary skill in the art would appreciate that by integrating different clinics with different manufacturers who provide products without controlling either entities allows for flexibility and customization from the end-user perspective. Because the operations occur seamlessly without requiring investment in infrastructure from either side, the data processing entity has the capability to generate automated reporting or notification of low inventory.

Distribution Network 140 can be different wireless and wired networks available to connect different computer devices including client and server systems. In an implementation, distribution network 140 is publicly accessible on the internet through secure messaging protocol described herein. In an implementation, distribution network 140 is inside a secure corporate wide area network. In an implementation, distribution network 140 allows connectivity of different systems and devices using a computer-readable medium.

The messaging and notification between different components can be implemented using Application Programming Interface (API) calls, eXtensible Markup Language ("XML") or JavaScript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use Data Encryption Standard (DES), TripleDES, Rivest, Shamir Adleman algorithm (RSA), Advanced Encryption Standard (AES) or other methods known in the industry.

Figure 2:
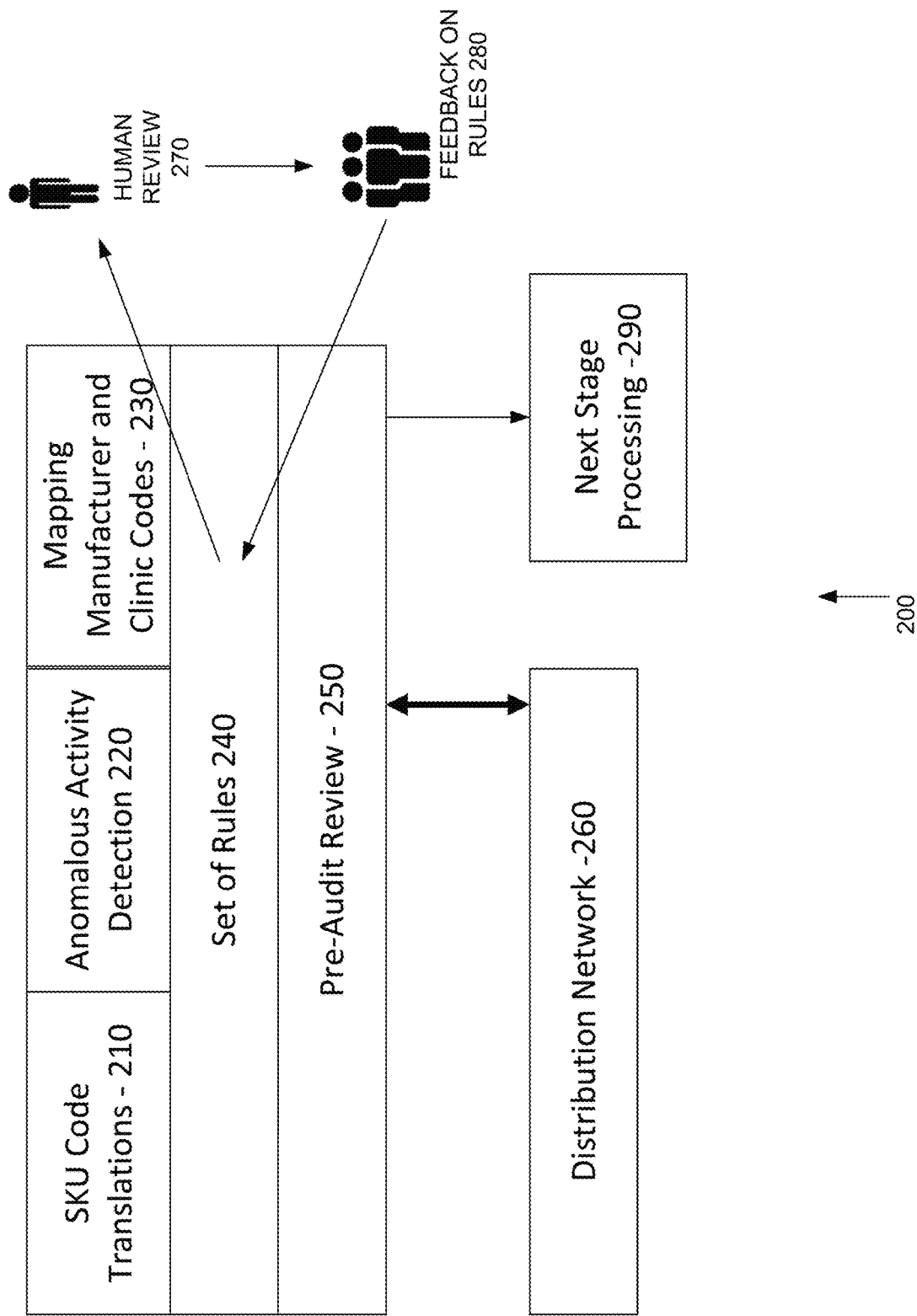
FIG. 2 shows exploded view of a computing device interacting with rules and next stage of processing based on feedback on rules from human review, according to one embodiment.

FIG. 2 is an exploded view 200 of a computing device interacting with rules and next stage of processing based on feedback on rules from human review, according to one embodiment. For example, human Alias-1 270 is associated with a computing device that may have one or more operating systems including Android, iPhone Operating System (iOS) or Internet of Things (IoT) operating system. The computing device includes software module for pre-audit review module 250 that can be controlled by the distribution network API/hooks 260 that are incorporated at a system level on the computing device. In one embodiment, depending on the computing device platform the distribution network overlay hooks are implemented using Java Android Software Development Kit (SDK)90, Objective C, or C++. In one embodiment, any and all communications are controlled using the distribution network overlay architecture that encompasses the operating system to allow for component-based flexibility. In one embodiment, a user can customize the alias to go in and out of the distribution network overlay architecture mode. In one embodiment, the overlay network is based on peer to peer network. In one embodiment, the distribution network using an overlay network using the existing public network.

In one embodiment, the computing device includes applications or services that request and make transactions and date entry that are processed for a set of rules 240 in the distribution network. There is a list for mapping SKU Codes to uniform codes 210, anomalous activity detection 220 and mapping manufacturer and clinic codes 230 along with dosage and price ranges. Once the data processing is complete with audit review, the data is sent for next stage processing 290. In one embodiment, the next stage processing requires manual approval by an operator at a clinic. In one embodiment, the next stage processing includes sending processed data to a manufacturer.

In one embodiment, anomalous activity includes detecting low inventory. In one embodiment, anomalous activity includes detecting pricing that is out of minimum and maximum range for a given dosage.

In one embodiment, a manual review and actions are triggered by groups 280 that provides feedback to the set of rules 240 for automated auditing. For example, if a particular pricing anomaly keeps creeping up in transactions multiple times, an automated rule will be created to handle that automatically without requiring manual review of the same type of error multiple times. A person of ordinary skill in the art would understand that the rules evolve and are automatically customized based on manual review and usage.

In one embodiment, the clinic has software application that is responsible for extracting data collected from the user interfaces and submitting it to the data processing entity. In one embodiment, an operator at a clinic can configure the time of the synchronization operation so that it does not interfere with the clinic's normal operation; manually initiate a synchronization operation; define the persistence period of the logs collected during the normal operation and start and stop the software extraction service.

The daily synchronization operation performed by the clinic through an automated agent has several steps: authenticate the Agent with the software at data processing entity, submit a list of specific library files to the software at data processing entity to see if any updates are available; download and install any updates to the specific library files used by the systems; download the start date of the invoices that need to be retrieved; download data that indicate whether the following items need to be submitted in addition to invoice data: Product list, Appointments, Reminders and Full list of clients and patients. Extract the data request by the software at data processing entity. Submit the extracted data. Daily synchronization operation is totally automated, transparent to the clinic, and typically takes only a few minutes. The Agent does not write any data to the database at the clinic to avoid interfering with the correct operation of the clinic's setup.

An important task is performed by 210 that requires mapping the SKU codes used by the clinic to the set of canonical codes used by software at data processing entity. Every individual clinic has unique codes and nomenclatures, sometimes these variations number in the thousands. Data processing software operates with over 7500 US clinics, allowing for thousands of code variations for a single product or service. These are not standardized across the veterinary industry. Data processing software relies on the canonical codes to correctly identify products on the invoices for reporting, processing of coupons, and wellness items, and so mapping is necessary before the clinic will benefit of the services offered by data processing entity.

FIG. 3 outlines a view 300 of clinics that a data processing entity may handle at any given time, according to one embodiment. The operation and execution of pre-audit review module 250 from FIG. 2 is seen in more detail in the context of FIG. 3. PAR stands For Pre-Audit Review. PAR's is a system that was developed to validate data and identify errors in the data submitted. If a transaction finds its way into the PAR system for a first time, it is an indication of some anomaly and further review from a human must occur. The PAR system has taken data entry accuracy to over 99% when compared to what was filled out manually.

An example of an issue PAR was designed to help with is when clinics use codes that represent incorrect SKU sizes. Item code ABC123 is in a clinic practice management system and denotes a six-pack of Heartgard Green 26-50 lbs with a price of $60, i.e., sixty dollars. This indicates that a quantity of one on an invoice equals six doses of Heartgard Green at $60. Thus, a quantity of 0.5 equals three doses of Heartgard Green at $30, and so on.

Occasionally clinics want to sell a single dose. This should be entered as a quantity of 0.17, but some clinics instead leave the quantity set to one and just edit the price on the line item to $10. The problem arises when the qualifying offer is for six doses: the code for a six pack is used, but the price ($10) is not compatible with that of six doses. The discrepancy needs to be resolved by a Greenline representative to ensure no invalid offers are submitted to the manufacturers.

PAR not only contains a set of rules generally applicable to all clinics, but also lets new rules be created or existing rules customized as required to handle issues that affect specific clinics.

The PAR system also helps catching mapping errors where codes are used on invoices in ways distinct from what the clinic initially communicated to data processing.

The Clinics view 370, shows the filtering for number of entries (100) and Status of clinics, i.e. Active Clinics. These are clinics that are actively using the data processing software. The view includes Export button to export this information to an excel spreadsheet or pdf. A unique id 310 is associated with each clinic is displayed. The next field displayed is the name of the Clinic 315. The subsequent field installation date 320 gives the date of installation at that Clinic 315. The next field gives the last date of the invoice 325 that was entered. The next field shows the date of product synchronization 330, i.e. date when product codes entered at the clinic are conformed to the codes at the data processing software. The next field shows number of dirty redemptions allowed 335. The next field shows transactions pending approval 340. The next field shows number of transactions flagged in pre-audit review 345. The next field shows the mapped products 350. The next field gives number of recommendations 355 based on the issue flags. The next field shows manual changes required 360. The next field shows different action/status buttons 365 including go green that allows for next stage processing as well as selecting parameters that promote a green environment. A person of ordinary skill in the art would understand that the perspective allows making decisions involving thousands of clinics for a group of transactions at the same time.

Figure 4:
FIG. 4 is a view of data entry transactions received from one of the clinics, according to one embodiment.

FIG. 4 shows a view 400 of data entry transactions received from one of the clinics, according to one embodiment. Similar to what is shown in FIG. 3, after selecting a clinic, for example, 110-1, details of different transaction anomalies caught by pre-audit review can be viewed. The field of the invoice number 410 for the clinic transaction is displayed. The next field shows the date of the invoice 415. The next field gives the reason for the pre-audit flag 420 on that transaction. For example, "Below Min price. Additional details on the analysis can also be reviewed here by clicking on a given transaction for additional details. Each reason has a reason id associated with the reason. The next field gives product name 425. The next field gives end-user or pet owner name 430. The next field gives quantity of the product sold 435. The next field gives offer or discount codes 440. The next field gives an option to override the error 445. The next field is the reprocess button 450 that goes through the review process again.

In FIG. 4, we see several examples of anomalous activity. PAR can detect issues with high or low pricing (e.g., $10 for six doses of a product), naming convention and word combinations, and quantities that are out of the norm (e.g., 200 does of flea/tick medication under a single patient on the invoice).

These issues are very difficult for a clinic to find and validate since many of them center around codes that are used (correctly) most of the time, but mistakenly used differently in a few instances, and because clinic management systems are not designed for flag these discrepancies upon invoice creation.

FIG. 5 is an exploded view of rules 500 for pricing and dosage, according to one embodiment. The screenshots show the process by which the data processing software allows manual edit of different rules within a single clinic. When the data processing software sets the minimum and maximum price range for a given dosage, a rule for pre-audit review is created. Price can also be adjusted for a clinic. For example, this allows different clinics to have different prices for the same product based on their location or supply/demand for a given product. The pre-audit review software works seamlessly across both the clinics while allowing for individualized customizations.

The Master parameters show the data processing software parameters. The field shows the clinic information 510, clinic product and corresponding master product. The next field shows quantity is set for the product 520. The next field shows minimum price 530 is set for the Master data processing software and clinic. The next field shows maximum price 540 is set for Master and maximum price 550 is set for Clinic. The next field shows maximum price 560 per dose is set for Master and corresponding price is set for Clinic 570. A person of ordinary skill in the art would appreciate that the per dose qualification varies from clinic to clinic. A per dose quantity is set for the Master. Clinic dose equivalents are adjusted according to the set value in Master.

Figure 6:
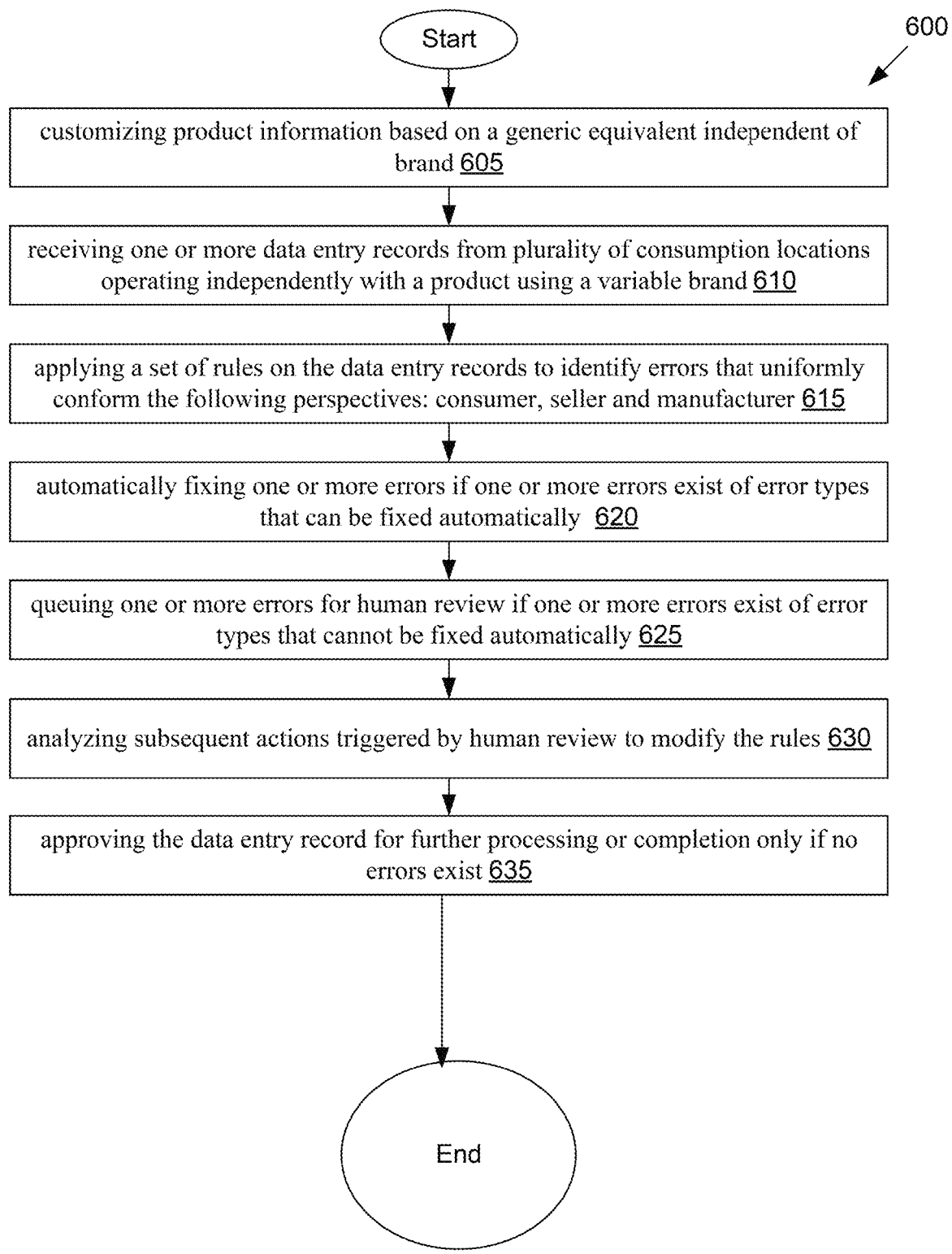
FIG. 6 shows a flowchart illustrating an example of a method of auditing data entry for a distribution network of products, according to one embodiment.

FIG. 6 depicts a flowchart 600 illustrating an example of a method of auditing data entry for a distribution network of products, according to one embodiment. The flowchart 600 is discussed in conjunction with the environment shown in the diagram 100 in FIG. 1. At block 605, begins with customizing product information based on a generic equivalent independent of brand. At block 610, receiving one or more data entry records from plurality of consumption locations operating independently with a product using a variable brand. At block 615, applying a set of rules on the data entry records to identify errors that uniformly conform the following perspectives: consumer, seller, and manufacturer. At block 620, automatically fixing one or more errors if one or more errors exist of error types that can be fixed automatically. At block 625, queuing one or more errors for human review if one or more errors exist of error types that cannot be fixed automatically. At block 630, analyzing subsequent actions triggered by human review to modify the rules. At block 635, approving the data entry record for further processing or completion only if no errors exist. A person of ordinary skill in the art would appreciate that by following the steps outlined above that is inbuilt into the computing device, the distribution network enforces transactions that are trusted, customized control at the transaction level as well as allowing processing bundled transactions together. Such processing is implemented network wide.

In a broad embodiment, the invention is systems and methods of automated auditing of data entry for a distribution network of products that allows flagging errors as well as fixing errors. The system evolves and learns from manual review and corrections that are applied to the flagged errors. The rules can be customized for a given clinic as well as applicable by default across many clinics.

Figure 7:
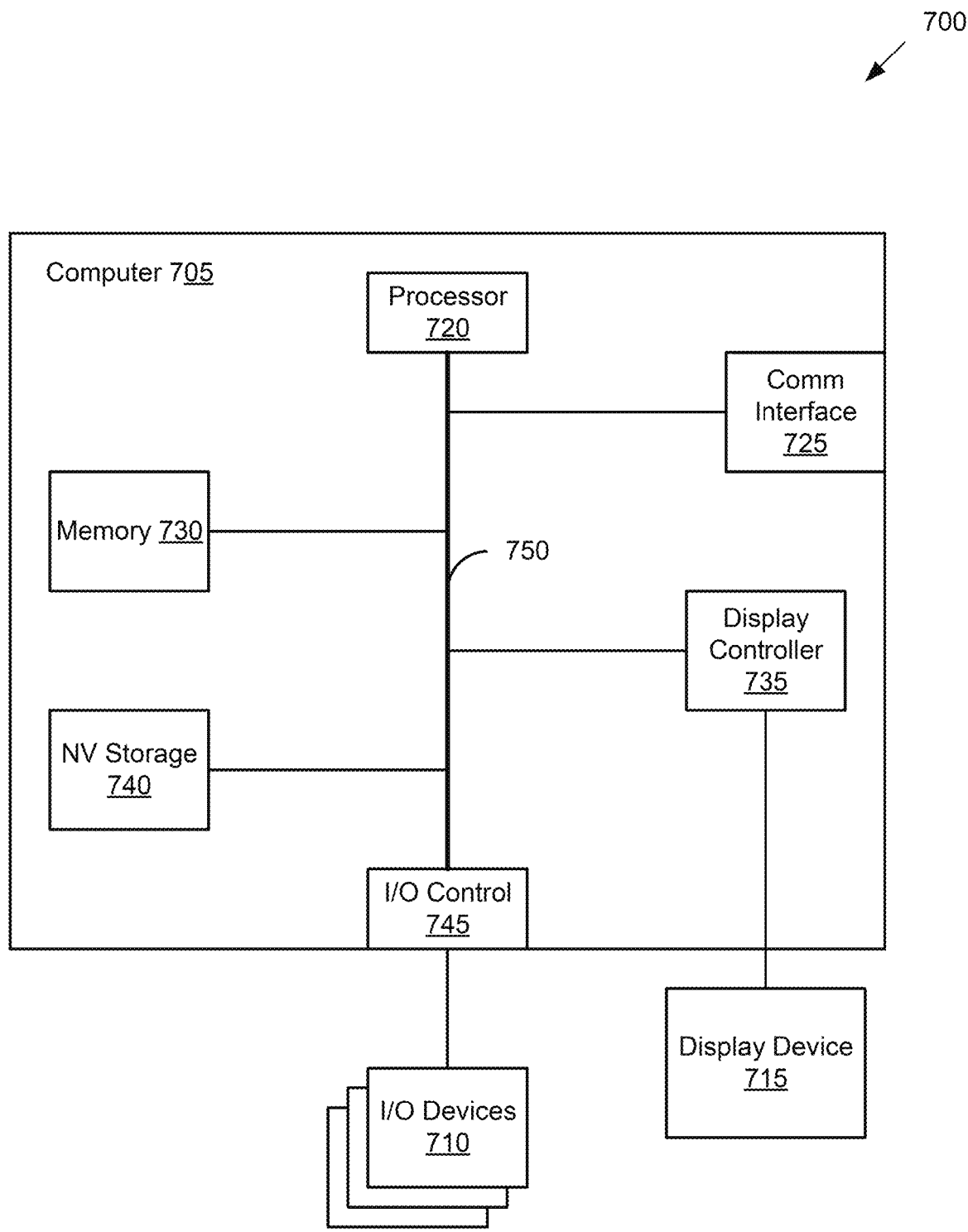
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, clinic computing system 110, device manufacturers 120, veterinary clinic computing devices 130, pet owner devices 150 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, Input/Output (I/O) devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, Integrated Services for Digital Networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random-Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as Dynamic RAM (DRAM) and Static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a Read-Only Memory (ROM), such as a Compact Disc Read Only Memory (CD-ROM), Erasable Programmable Read-Only Memory (EPROM), or Electrically Erasable Programmable Read-Only Memory (EEPROM), a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

A person of ordinary skill in the art would appreciate that automated auditing of data entry on the distribution network for products includes network wide control and flexibility as well as individual level control and flexibility without having direct control of a clinic or manufacturer.

Figure 8:
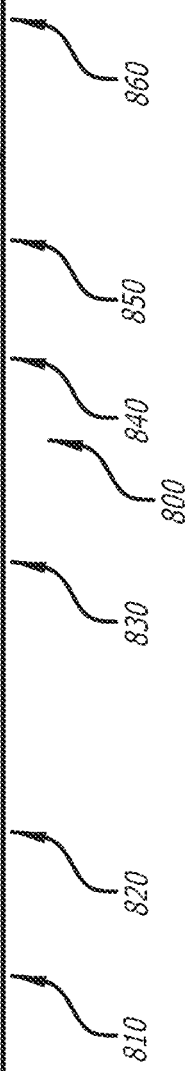
FIG. 8 is an exploded view of recommendations for adjustment according to rules, according to one embodiment.

In FIG. 8 that shows an exploded view 800 of recommendations for adjustment according to rules, according to one embodiment. Once a transaction is reviewed and the appropriate correction applied, the transaction can either flow normally to the audit page for the usual review by the clinic or be rejected so that it cannot be forwarded to the manufacturer. The transactions flagged by automated pre-audit review, let data processing software initiate an informed dialog with the clinic to let it know of the incorrect usage and its detrimental effect to the clinic's inventory numbers, and discuss appropriate ways to correct and thus avoid the issue on subsequent invoices.

One of the benefits of pre-audit review, however, is that rejected transactions cannot be or submitted to the manufacturer, nor reported as valid in data processing, contributing to a high degree of data accuracy. The Recommendation page is data processing's use of machine learning to increase data accuracy and standardization. This system is built around automatically mapping the clinic codes to data processing's master canonical codes. Currently, the system "grades" the products on where it would put them, where a human then signs off to generate the training data necessary to improve the auto-mapping process.

Critical Updates are for products that we have previously mapped, but a characteristic has changed at the clinic. Possibilities include product name or description, average pricing, and average quantity.

The screen in FIG. 8 shows several useful pieces of information. The code from the clinic is listed 810, the description or product name 820, whether this is a new code or an update of an old code 830, pricing history 840, pricing and usage 850, and finally the data processing review output 860. The engine arrives at this output through a combination of word choice, spelling, phonetical similarity, pricing and prior mapping experience. The system then provides a weighted recommendation for the data processing software to make the final choice.

Figure 9:
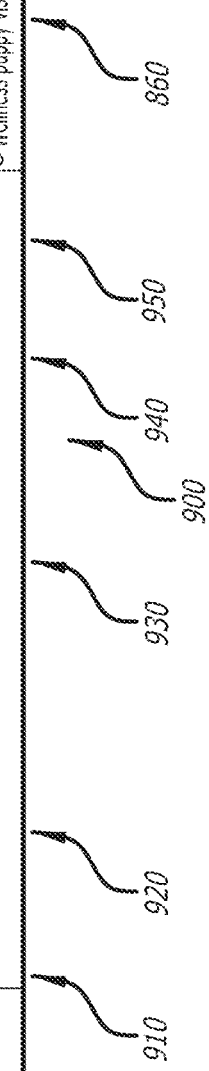
FIG. 9 is an exploded view of mapping to uniform transaction codes, according to one embodiment.

FIG. 9 is an exploded view 900 of mapping to uniform transaction codes, according to one embodiment. In this example we see an 85% certainty of the product. This view also shows average pricing and usage. These information points are useful to the data processing software when the description is somewhat ambiguous. The field product id 910, next field gives product description 920 which is missing for some transactions, next field is the change 930, the next field gives the history 940, the next field gives quantity and pricing 950 and the next field gives the recommended fix 960 with a percentage of recommended certainty.

Figure 10:
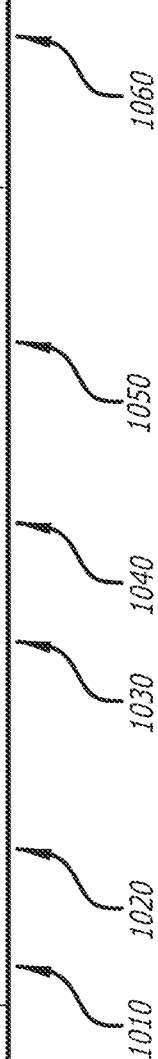
FIG. 10 is an exploded view of options to correct a mapping to uniform transaction codes, according to one embodiment.

FIG. 10 is an exploded view 1000 of options to correct a mapping to uniform transaction codes, according to one embodiment. The view has shifted to critical updates. Critical updates are defined as additions or changes to currently mapped codes OR a new code has been created that the system identifies as relevant to us to be mapped. The screenshot shows an addition of a new product. The system flags a new product and requests product mapping information. The fields include the product code 1010, product description 1020, the change 1030, history 1040, price and dosage 1050 and the recommendation 1060.

Figure 11:
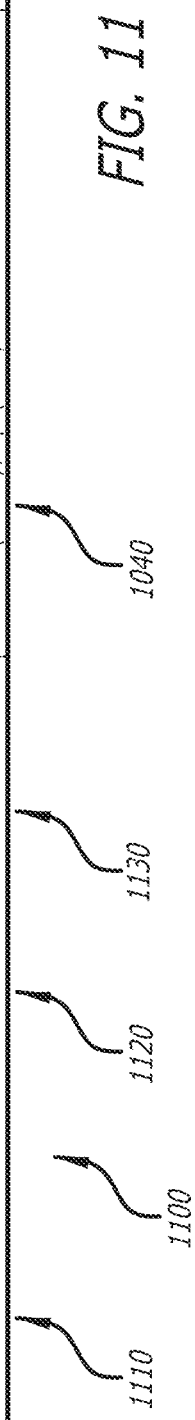
FIG. 11 is a second exploded view of options to correct a mapping to uniform transaction codes, according to one embodiment.

FIG. 11 is a second exploded view 1100 of options to correct a mapping to uniform transaction codes, according to one embodiment. Here, an existing product is changed to have a different name or description. This can happen when a clinic adds, changes, and retires codes. A clinic may do this frequently without being mindful of the impact on processing at the manufacturer end. The data processing software absorbs these changes and its impact to allow for a smooth ongoing operation with the manufacturer end. Many of the codes may not be relevant from data processing standpoint. The fields include the product code 1110, product description 1120, the change 1130, history 1140, price and dosage 1150 and the recommendation 1160.

The recommendation engine looks at name, pricing features, phonetics, etc. to provide a probability score to the data processing software to increase both data accuracy and assist with data validation.

With several million unique codes in our database across over thousands of clinics, being able to know which clinics have added or changed relevant codes is paramount. Without the artificial intelligence software built, it would require many more data processing human operators to comb through individual codes clinic by clinic to know what codes are relevant or not. Also, the more data processing software uses the system, the smarter it becomes.

Figure 12:
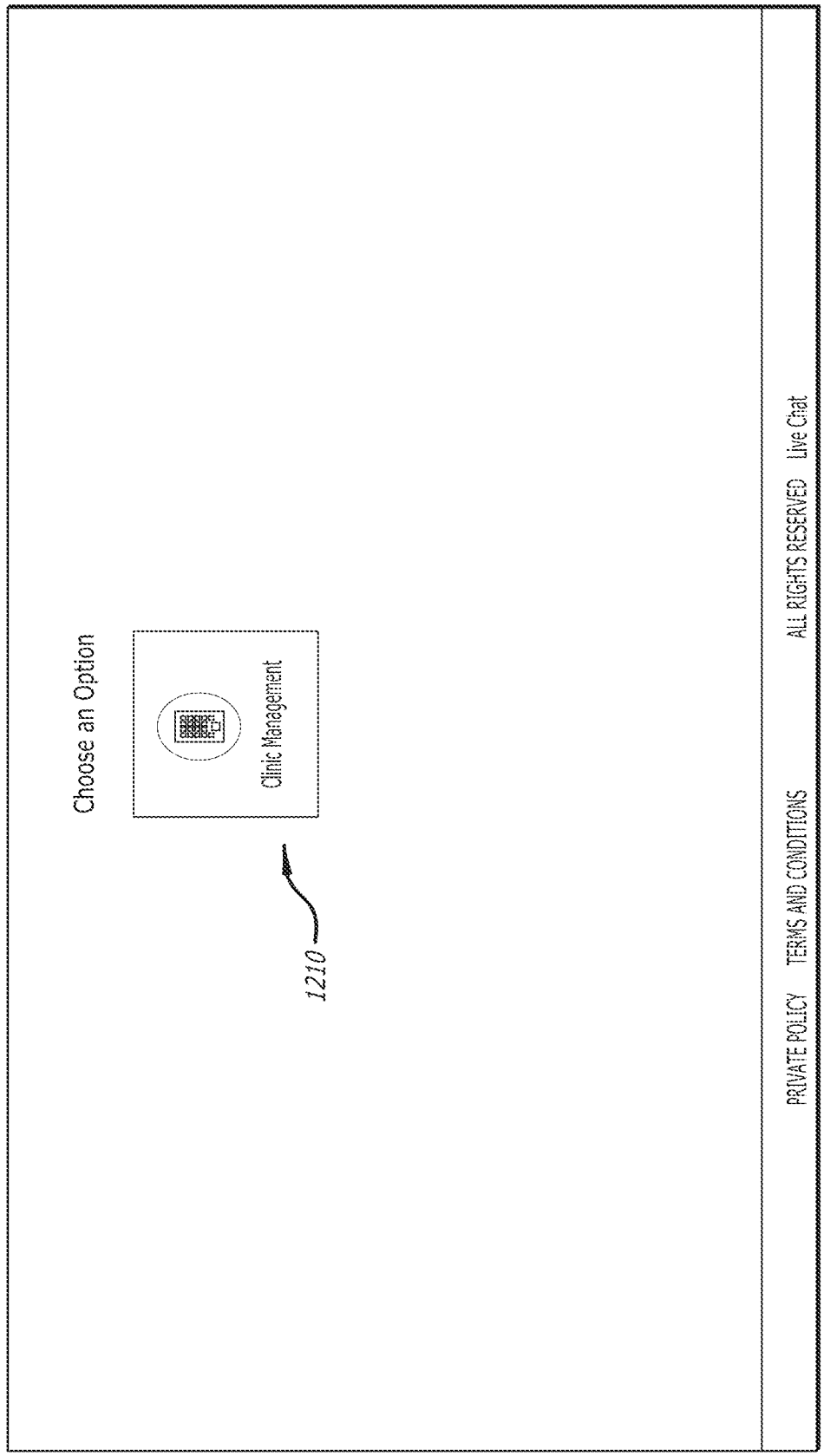
FIG. 12 is a high-level view for clinic management, according to one embodiment.

FIG. 12 is a high-level view 1200 for clinic management, according to one embodiment. The option 1210 in the software shows that multiple clinics can be managed easily with flexibility from the data processing software.

FIG. 13 is a view of clinics 1300 that a data processing entity may handle at any given time with flagged markers, according to one embodiment. This is another example of that shown in FIG. 3. The fields include a unique id 1310 associated with each clinic is displayed. The next field includes the Clinic 1315 name. The next field includes the installation date 1320. The next field gives the last date of the invoice 1325 that was entered. The next field gives the date of product synchronization 1330, i.e. date when product codes entered at the clinic are conformed to the codes at the data processing software. The next field shows number of dirty redemptions 1335 allowed. The next field shows transactions pending approval 1340. The next field shows number of transactions flagged 1345 in pre-audit review. The next field shows the mapped products 1350. The next field gives number of recommendations 1355 based on the issue flags. The next field shows manual changes 1360 required. The next field shows different action/status buttons 1365 including go green that allows for next stage processing. A person of ordinary skill in the art would understand that the perspective allows making decisions involving thousands of clinics for a group of transactions at the same time.

FIG. 14 is a second view 1400 of clinics that a data processing entity may handle at any given time with flagged markers, according to one embodiment. This shows the last page with different filter views for clinic management.

FIG. 15 is an exploded view 1500 of options to correct a mapping to uniform transaction codes with dosage information, according to one embodiment. The product names on the left-hand side are data processing software's internal canonical list of mappable products. In the drop down on the right, these are the clinic products, descriptions, and internal clinic codes.

In the "My Product" column dropdown shown below, the data processing operator will see one of three variations for a product or service. Through machine learning and artificial intelligence, intelligent mapping guides the operator to make correct mapping decisions based on the font or color. For example, for Bold Font: The clinic is actively using this code. This helps identify the correct code in cases where the clinic may have multiple codes for the same product but are not using them. For "Greyed Out": A data processing operator has already mapped this code. This is to help data validation. A code can only represent one item on the data processing canonical list. For Non-Bold Font: A code that the clinic has in their system but has not used recently.

The highlighted area 1510, shows that to make the data processing software robust enough to handle any unique situation (uncommon SKU quantities, multiple codes for the same product, etc.), an operator can change SKU quantities and other attributes while still categorizing the code in the correct general product. These other attributes include flags to ignore quantity (helpful with injectable products), one for free dose designation (such as samples), and another to exclude a product from the coupon engine (usually used with clinics online store codes).

The highlighted area 1520, shows that to make the data processing software robust enough to handle any unique situation (uncommon SKU quantities, multiple codes for the same product, etc.), an operator can change SKU quantities and other attributes while still categorizing the code in the correct general product. These other attributes include flags to ignore quantity (helpful with injectable products), one for free dose designation (such as samples), and another to exclude a product from the coupon engine (usually used with clinics online store codes). In 1510, once accepted the suggested code is SAVED. Whereas, in 1520, the suggested codes are requesting user approval.

The highlighted area 1530 shows an example of "custom mapping". As mentioned earlier, there are no standardized codes in the veterinary industry. In the example below, the clinic has a code for both a single dose and four dose presentation for the same product, Advantage Blue. Correct mapping of those distinct codes is essential for the subsequent processing of invoice data. The "greyed out" area 1520 products or services that have already been mapped.

While the examples herein are shown for distribution network of products for pets that sold at different veterinary clinics and sourced from different manufacturers, a person of ordinary skill in the art would understand that the disclosure can be applied to different types of distribution networks of products. For example, this could apply equally to a distribution network for contact lens and ophthalmologists, salons with beauty parlor products, fitness/gyms with instructors, or dentist with cosmetic teeth whitening products.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the distribution network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of automated auditing data entry for a distribution network of products, comprising:
   customizing product information based on a generic equivalent independent of brand;
   receiving one or more data entry records from plurality of consumption locations operating independently with a product using a variable brand;
   applying a set of rules on the data entry records to identify one or more errors that uniformly conform one or more of the following perspectives: consumer, seller and manufacturer;
   determining whether one or more errors exist;
   identifying whether one or more errors that exist are of error types that can be fixed automatically;
   automatically fixing one or more errors if one or more errors exist of error types that can be fixed automatically;
   identifying whether one or more errors that exist are of error types that cannot be fixed automatically;
   queuing one or more errors for human review if one or more errors exist of error types that cannot be fixed automatically;
   analyzing subsequent actions triggered by human review to modify the rules;
   approving the data entry record for further processing or completion only if no errors exist.

2. The method of claim 1, wherein the error is error of stock keeping unit (SKU) size and price that can be fixed automatically.

3. The method of claim 2, further comprising: updating the inventory numbers at the consumption location to conform correctly.

4. The method of claim 1, wherein the error is a typographical error in a description, naming convention and word combinations that can be fixed automatically.

5. The method of claim 1, wherein the error is based on use of code for a variable brand used previously that can be fixed automatically.

6. The method of claim 1, wherein the error is a mapping error based on previous data entry patterns at the consumption location.

7. The method of claim 1, wherein the rules are customized for a consumption location.

8. The method of claim 1, further comprising:
   receiving and customizing service information associated with the product;
   validating based on rules for service the service information.

9. The method of claim 1, further comprising:
   transmitting conformed data to associated manufacturers for further processing.

10. The method of claim 1, further comprising:
    transmitting conformed data to consumption location to automatically update inventory.

11. A system of automated auditing data entry for a distribution network of products, comprising:
    an audit computing device configured to:
       customize product information based on a generic equivalent independent of brand;
       receive one or more data entry records from plurality of consumption locations operating independently with a product using a variable brand;
       apply a set of rules on the data entry records to identify one or more errors that uniformly conform one or more of the following perspectives: consumer, seller and manufacturer;
       determine whether one or more errors exist;
       identify whether one or more errors that exist are of error types that can be fixed automatically;
       automatically fix one or more errors if one or more errors exist of error types that can be fixed automatically;
       identify whether one or more errors that exist are of error types that cannot be fixed automatically;
       queue one or more errors for human review if one or more errors exist of error types that cannot be fixed automatically;
       analyze subsequent actions triggered by human review to modify the rules;
       approve the data entry record for further processing or completion only if no errors exist.

12. The system of claim 11, wherein the error is error of stock keeping unit (SKU) size and price that can be fixed automatically.

13. The system of claim 12, further comprising: updating the inventory numbers at the consumption location to conform correctly.

14. The system of claim 11, wherein the error is a typographical error in a description, naming convention and word combinations that can be fixed automatically.

15. The system of claim 11, wherein the error is based on use of code for a variable brand used previously that can be fixed automatically.

16. The system of claim 11, wherein the error is a mapping error based on previous data entry patterns at the consumption location.

17. The system of claim 11, wherein the rules are customized for a consumption location.

18. The system of claim 11, further comprising the audit computing device configured to:
    receive and customize service information associated with the product;
    validate based on rules for service the service information.

19. The system of claim 11, further comprising the audit computing device configured to:
    transmit conformed data to associated manufacturers for further processing.

20. The system of claim 11, further comprising the audit computing device configured to:
    transmit conformed data to consumption location to automatically update inventory.

* * * * *